(12) United States Patent
Li et al.

(10) Patent No.: US 12,476,744 B2
(45) Date of Patent: Nov. 18, 2025

(54) INFORMATION FEEDBACK METHOD, RESOURCE SCHEDULING METHOD, TERMINAL, AND NETWORK DEVICE

(71) Applicant: VIVO MOBILE COMMUNICATION CO., LTD., Dongguan (CN)

(72) Inventors: Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 438 days.

(21) Appl. No.: 17/973,515

(22) Filed: Oct. 25, 2022

(65) Prior Publication Data

US 2023/0047407 A1    Feb. 16, 2023

Related U.S. Application Data

(63) Continuation of application No. PCT/CN2021/088735, filed on Apr. 21, 2021.

(30) Foreign Application Priority Data

Apr. 28, 2020    (CN) .......................... 202010352370.7

(51) Int. Cl.
    *H04L 1/1829*    (2023.01)
    *H04B 7/06*    (2006.01)
    *H04L 5/00*    (2006.01)
    *H04L 1/1812*    (2023.01)

(52) U.S. Cl.
    CPC ......... *H04L 1/1861* (2013.01); *H04B 7/0639* (2013.01); *H04L 5/0055* (2013.01); *H04L 1/1812* (2013.01)

(58) Field of Classification Search
    None
    See application file for complete search history.

(56) References Cited

U.S. PATENT DOCUMENTS

| | | | |
|---|---|---|---|
| 2012/0083283 | A1 | 4/2012 | Phan et al. |
| 2019/0074952 | A1* | 3/2019 | Bhattad ................ H04L 5/0055 |
| 2019/0132104 | A1* | 5/2019 | Lee ........................ H04W 4/40 |
| 2020/0106566 | A1* | 4/2020 | Yeo ........................ H04L 1/1812 |
| 2020/0344010 | A1* | 10/2020 | Lei .................... H04W 72/0446 |
| 2020/0374044 | A1* | 11/2020 | Lei ........................ H04W 72/23 |
| 2021/0204097 | A1* | 7/2021 | Takeda .................. H04W 72/21 |

(Continued)

FOREIGN PATENT DOCUMENTS

| | | |
|---|---|---|
| CN | 104272638 A | 1/2015 |
| CN | 106560011 A | 4/2017 |
| CN | 107078860 A | 8/2017 |

(Continued)

OTHER PUBLICATIONS

Extended European Search Report issued in related European Application No. 21797870.9, mailed Jul. 20, 2023, 9 pages.

(Continued)

*Primary Examiner* — Andrew C Oh
(74) *Attorney, Agent, or Firm* — IPX PLLC

(57) ABSTRACT

This application discloses an information feedback method, a resource scheduling method, a terminal, and a network device. The information feedback method includes: performing HARQ-ACK feedback for multicast downlink transmission and unicast downlink transmission in one time unit.

12 Claims, 6 Drawing Sheets

| Row index (RI) | K0 | Start | Length | Map type |
|---|---|---|---|---|
| 0 | 0 | #2 | 4 | B |
| 1 | 0 | #6 | 4 | B |
| 2 | 0 | #10 | 4 | B |
| 3 | 0 | #0 | 13 | A |
| 4 | 0 | #4 | 2 | B |
| 5 | 0 | #6 | 2 | B |
| 6 | 0 | #8 | 2 | B |
| 7 | 0 | #10 | 2 | B |
| 8 | 0 | #12 | 2 | B |

All possible PDSCH opportunistic of PDSCH TDRA form configured based on RRC

PDSCH TDRA form

(56) References Cited

U.S. PATENT DOCUMENTS

| | | | | |
|---|---|---|---|---|
| 2021/0288757 A1* | 9/2021 | Jacobsen | .............. | H04B 7/0456 |
| 2025/0038930 A1* | 1/2025 | Li | ........................ | H04L 1/1861 |

FOREIGN PATENT DOCUMENTS

| | | | | | |
|---|---|---|---|---|---|
| CN | 108023690 | A | | 5/2018 | |
| CN | 108023719 | A | | 5/2018 | |
| CN | 110447192 | A | | 11/2019 | |
| CN | 110944403 | A | | 3/2020 | |
| CN | 110945815 | A | * | 3/2020 | ........... H04L 5/0055 |
| CN | 113475133 | A | * | 10/2021 | ............ H04W 72/20 |
| CN | 113556216 | A | * | 10/2021 | ............ H04W 72/23 |
| CN | 114451067 | A | * | 5/2022 | ............ H04L 5/0053 |
| CN | 113194544 | B | * | 10/2023 | ............ H04W 72/21 |
| CN | 113170532 | B | * | 3/2024 | ............ H04L 1/1887 |
| WO | WO-2016171457 | A1 | * | 10/2016 | ............... H04L 1/00 |
| WO | WO-2017015836 | A1 | * | 2/2017 | ............ H04W 28/04 |
| WO | WO-2020032779 | A1 | * | 2/2020 | ............ H04W 72/23 |
| WO | 2020068973 | A1 | | 4/2020 | |
| WO | WO-2020144833 | A1 | * | 7/2020 | ........... H04L 1/1887 |
| WO | WO-2021109037 | A1 | * | 6/2021 | .............. H04W 4/06 |
| WO | WO-2021192064 | A1 | * | 9/2021 | ............. H04L 5/001 |

OTHER PUBLICATIONS

Catt, "Sidelink physical layer procedures in NR V2X", 3GPP Draft, R1-1912159, Nov. 2019, 8 pages.

International Search Report issued in corresponding International Application No. PCT/CN2021/088735, mailed Jul. 7, 2021, 6 pages.

Zte, "Discussion on Mechanisms to Improve Reliability for RRC_CONNECTED UEs", 3GPP TSG RAN WG1 #104b-e R1-2102502 E-Meeting, Apr. 2021.

Moderator Huawei, "FL Summary#2 on Improving Reliability for MBS for RRC_CONNECTED UEs", 3GPP TSG RAN WG1 Meeting #103-e R1-2009539 E-meeting, Nov. 2020.

Moderator Huawei, "FL Summary#3 on Improving Reliability for MBS for RRC_CONNECTED UEs", 3GPP TSG RAN WG1 Meeting #103-e R1-2009654 E-meeting, Nov. 2020.

Fist Office Action issued in related Chinese Application No. 202010352370.7, mailed Mar. 2, 2022, 14 pages.

* cited by examiner

Perform HARQ-ACK feedback for multicast downlink transmission and unicast downlink transmission in one time unit 101

FIG. 1

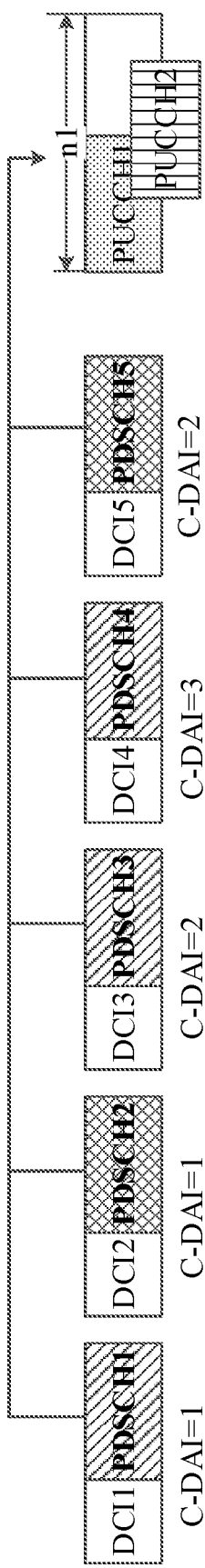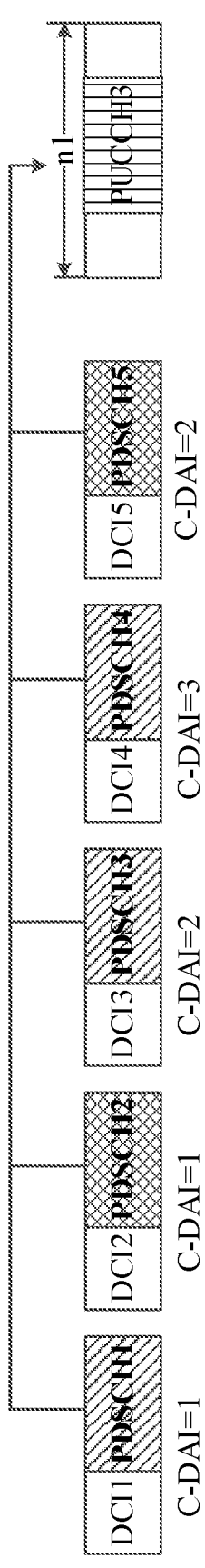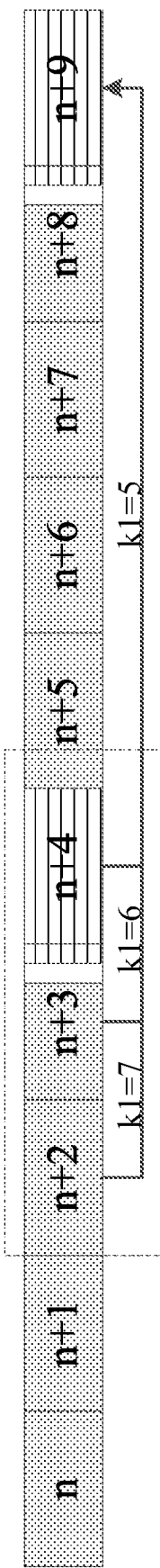
FIG. 2A
FIG. 2B
FIG. 3A

| Row index (RI) | K0 | Start | Length | Map type |
|---|---|---|---|---|
| 0 | 0 | #2 | 4 | B |
| 1 | 0 | #6 | 4 | B |
| 2 | 0 | #10 | 4 | B |
| 3 | 0 | #0 | 13 | A |
| 4 | 0 | #4 | 2 | B |
| 5 | 0 | #6 | 2 | B |
| 6 | 0 | #8 | 2 | B |
| 7 | 0 | #10 | 2 | B |
| 8 | 0 | #12 | 2 | B |

PDSCH TDRA form

All possible PDSCH opportunistic of PDSCH TDRA form configured based on RRC

FIG. 3B

INFORMATION FEEDBACK METHOD, RESOURCE SCHEDULING METHOD, TERMINAL, AND NETWORK DEVICE

CROSS-REFERENCE TO RELATED APPLICATIONS

This application is a continuation of International Application No. PCT/CN2021/088735, filed Apr. 21, 2021, which claims priority to Chinese Patent Application No. 202010352370.7, filed Apr. 28, 2020. The entire contents of each of the above-referenced applications are expressly incorporated herein by reference.

TECHNICAL FIELD

This application relates to the field of communication technologies, and in particular, to an information feedback method, a resource scheduling method, a terminal, and a network device.

BACKGROUND

In the prior art, unicast Physical Downlink Shared Channel (PDSCH) transmission and its Hybrid Automatic Repeat reQuest acknowledgment (HARQ-ACK) feedback are supported. When multicast PDSCH transmission is introduced, because HARQ-ACK feedback can improve the reliability of PDSCH transmission, the multicast PDSCH transmission also needs to support HARQ-ACK feedback. Therefore, in a case that the terminal supports both multicast downlink transmission and unicast downlink transmission, how to perform HARQ-ACK feedback of multicast downlink transmission and unicast downlink transmission is a problem that needs to be resolved at present.

SUMMARY

An objective of embodiments of this application is to provide an information feedback method, a resource scheduling method, a terminal, and a network device.

According to a first aspect, an embodiment of this application provides an information feedback method, applied to a terminal, including:

performing HARQ-ACK feedback for multicast downlink transmission and unicast downlink transmission in one time unit.

According to a second aspect, an embodiment of this application provides a resource scheduling method, applied to a network device, including:

sending DCI to a terminal, where the DCI is used for scheduling the terminal to feed back HARQ-ACK information of multicast downlink transmission and unicast downlink transmission only in different time units;

or the DCI is used for scheduling the terminal to feed back HARQ-ACK information of multicast downlink transmission and unicast downlink transmission in different time units or on non-overlapping uplink resources in a same time unit;

or the DCI is used for scheduling the terminal to feed back HARQ-ACK information of multicast downlink transmission and unicast downlink transmission on non-overlapping uplink resources.

According to a third aspect, an embodiment of this application provides an information feedback apparatus, applied to a terminal, including:

a feedback module, configured to perform HARQ-ACK feedback for multicast downlink transmission and unicast downlink transmission in one time unit.

According to a fourth aspect, an embodiment of this application provides a resource scheduling apparatus, applied to a network device, including:

a sending module, configured to send DCI to a terminal, where the DCI is used for scheduling the terminal to feed back HARQ-ACK information of multicast downlink transmission and unicast downlink transmission only in different time units;

or the DCI is used for scheduling the terminal to feed back HARQ-ACK information of multicast downlink transmission and unicast downlink transmission in different time units or on non-overlapping uplink resources in a same time unit;

or the DCI is used for scheduling the terminal to feed back HARQ-ACK information of multicast downlink transmission and unicast downlink transmission on non-overlapping uplink resources.

According to a fifth aspect, an embodiment of this application provides a communication device, including a memory, a processor, and a computer program stored in the memory and executable on the processor, where when executed by the processor, the computer program implements the steps of the foregoing information feedback method or the steps of the foregoing resource scheduling method. In some embodiments, the communication device may be a terminal or a network device.

According to a sixth aspect, an embodiment of this application provides a computer-readable storage medium, storing a computer program, where when executed by a processor, the computer program implements the steps of the foregoing information feedback method or the steps of the foregoing resource scheduling method.

According to a seventh aspect, an embodiment of this application provides a chip, including a processor and a communication interface, where the communication interface is coupled to the processor, and the processor is configured to execute a program or instructions, to implement the steps of the foregoing information feedback method or the steps of the foregoing resource scheduling method.

According to an eighth aspect, an embodiment of this application provides a computer software product, stored in a non-volatile storage medium, where the software product is configured to be executed by at least one processor to implement the steps of the foregoing information feedback method or the steps of the foregoing resource scheduling method.

In the embodiments of this application, a terminal may perform HARQ-ACK feedback for multicast downlink transmission and unicast downlink transmission in one time unit. Therefore, when scheduling feedback of HARQ-ACKs for multicast downlink transmission and unicast downlink transmission in a same time unit, the terminal can perform HARQ-ACK feedback for multicast downlink transmission and unicast downlink transmission in the same time unit, thereby improving the effectiveness of the communication system.

BRIEF DESCRIPTION OF THE DRAWINGS

FIG. 1 is a flowchart of an information feedback method according to an embodiment of this application.

FIG. 2A is a schematic diagram 1 of a HARQ-ACK feedback manner according to an embodiment of this application.

FIG. 2B is a schematic diagram 2 of a HARQ-ACK feedback manner according to an embodiment of this application.

FIG. 3A is a schematic diagram of a k1 set according to an embodiment of this application.

FIG. 3B is a schematic diagram of a PDSCH-TDRA form according to an embodiment of this application.

DETAILED DESCRIPTION

Figure 3C:
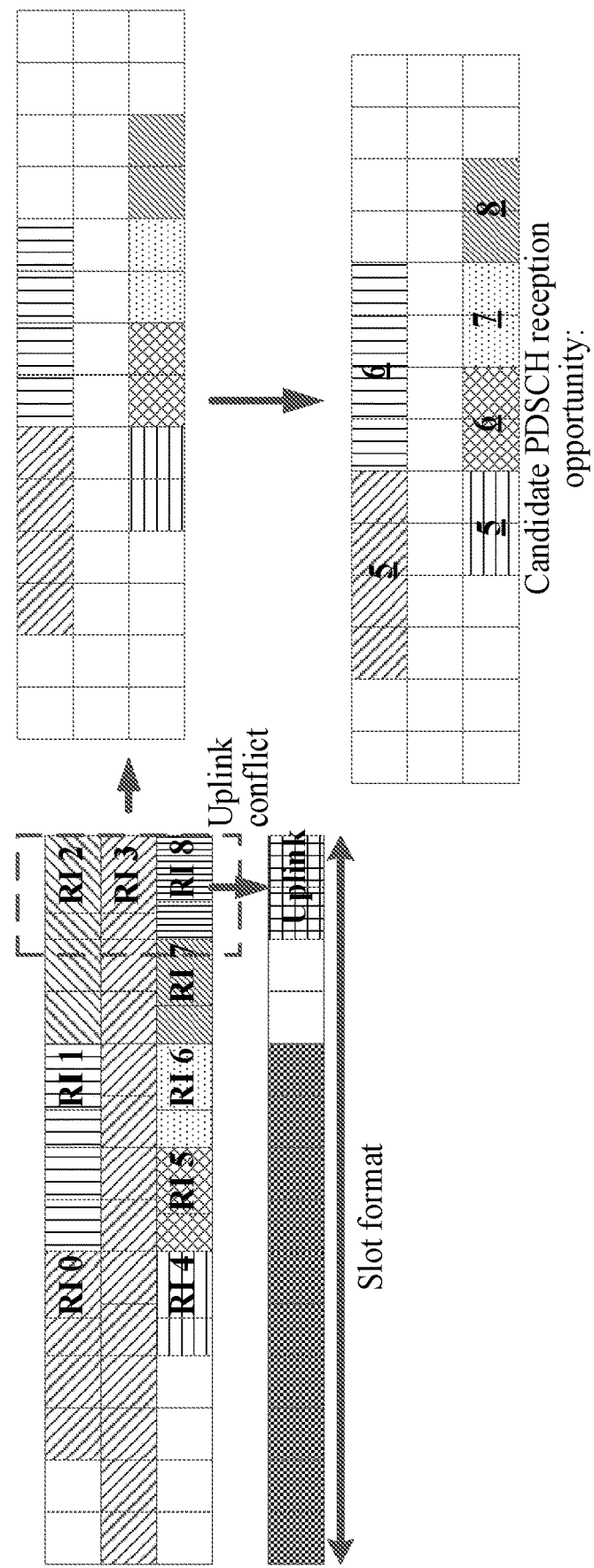
FIG. 3C is a schematic diagram of determining a candidate PDSCH reception opportunity according to an embodiment of this application.
Figure 4:
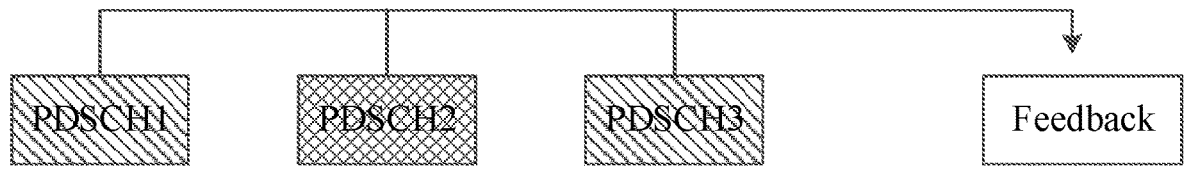
FIG. 4 is a schematic diagram of an aggregated feedback form according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

In the specification and claims of this application, terms "first" and "second" are used to distinguish similar objects, but are not used to describe a specific sequence or order. It should be understood that, the terms used in this way are exchangeable in a proper case, so that the embodiments of this application can be implemented in another order other than those shown or described herein. In addition, "and/or" used in the description and claims represents at least one of the connected objects. The character "I" generally indicates an "or" relationship between associated objects.

In the embodiments of this application, a wireless communication system includes a terminal and a network device. The terminal may also be referred to as a terminal device or a user terminal (User Equipment, UE). The terminal may be a terminal-side device such as a mobile phone, a tablet personal computer, a laptop computer, a personal digital assistant (personal digital assistant, PDA), a mobile Internet device (MID), a wearable device, or an in-vehicle device. It should be noted that a specific type of the terminal is not limited in the embodiments of this application. The network device may be a base station or a core network device. The base station may be a fifth-generation (5G) base station or a base station of a later version (for example, a gNB, or a 5G New Radio (NR) base station (Node Base station, NB)), or a base station (for example, an eNB, a Wireless Local Area Network (WLAN) access point, or another access point) in another communication system. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wireless Fidelity (Wi-Fi) node, or another proper term in the field, and is not limited to a specific term provided that a same technical effect is achieved.

For ease of understanding the embodiments of this application, the following content is first described:

A scenario to which the embodiments of this application are applicable includes, but is not limited to, a Multimedia Broadcast and Multicast Service (MBMS) scenario and a Multicast Broadcast Service (MBS) scenario. The MBMS or MBS may be referred to as a group cast service, a multicast service, or a broadcast service.

In some embodiments, UE may receive a plurality of broadcast multicast services (which may be referred to as multicast services) at the same time, and may also receive a unicast service and one or more multicast services at the same time.

In some embodiments, UE needs to perform HARQ-ACK feedback for a PDSCH or Physical Downlink Control Channel (PDCCH) of downlink transmission. The PDSCH is, for example, a dynamic scheduling PDSCH or a Semi-Persistent Scheduling (SPS) PDSCH of a PDCCH. The PDCCH is, for example, a PDCCH indicating SPS release, a PDCCH indicating a PDSCH of a Secondary Cell (SCell) that goes to sleep and that is not scheduled, a PDCCH that triggers type 3 HARQ-ACK feedback (one-shot HARQ-ACK feedback) and that does not schedule a PDSCH, or the like. Transmission of the HARQ-ACK information may be performed on a Physical Uplink Control Channel (PUCCH) resource or on a Physical Uplink Shared Channel (PUSCH) through multiplexing.

In an implementation, the UE receives a PDSCH at a slot n, and then, feeds back a HARQ-ACK at a slot n+k1, where k1 is indicated by a PDCCH that schedules the PDSCH, and a value range of k1 is configured by Radio Resource Control (RRC) signaling. On a side of a base station, the base station may receive corresponding HARQ-ACK information at a corresponding time position. If the base station does not receive the corresponding HARQ-ACK information, the base station considers that the UE does not receive the PDCCH that schedules the PDSCH (for example Discontinuous Transmission (DTX)), and needs to perform retransmission of the PDSCH. Because the UE can schedule a plurality of PDSCHs in one slot, and k1 may have different values, the UE may need to feed back HARQ-ACK information of a plurality of PDSCHs at a specific slot. Therefore, a correspondence between HARQ-ACK bit information and a PDSCH needs to be determined, that is, a HARQ-ACK codebook needs to be constructed.

The HARQ-ACK codebook may include different types, for example, a type 1 semi-persistent codebook and a type 2 dynamic codebook. During construction of a semi-persistent codebook, the UE mainly determines a candidate PDSCH reception opportunity according to a semi-persistently configured or predefined k1 set and a Time Domain Resource allocation (TDRA) form of the PDSCH, and each candidate PDSCH reception opportunity corresponds to 1-bit HARQ-ACK information (assuming that each PDSCH has only one Transport Block (TB) or is configured with spatial bundling, for example, harq-ACK-SpatialBundling-PUCCH). If the UE does not receive a PDSCH at a specific candidate PDSCH reception opportunity, the UE needs to feed back a Negative acknowledgment (NACK) at a corresponding HARQ-ACK bit position. During construction of a dynamic codebook, the UE mainly determines a number of bits and bit information of a HARQ-ACK according to dynamic scheduling information (for example, Downlink Assignment Index (DAI)) of each actually scheduled PDSCH.

This application is described below in detail with reference to the embodiments and accompanying drawings.

FIG. 1 is a flowchart of an information feedback method according to an embodiment of this application. The method is applied to a terminal. As shown in FIG. 1, the method includes following steps:

Step 101: Perform HARQ-ACK feedback for multicast downlink transmission and unicast downlink transmission in one time unit.

In this embodiment, the one time unit may be a time unit in which a base station schedules the terminal to feed back HARQ-ACK information for multicast downlink transmission and unicast downlink transmission. For example, the base station schedules the terminal to feed back HARQ-ACK information for multicast downlink transmission in a specific time unit, and also schedules the terminal to feed back HARQ-ACK information for unicast downlink transmission in the time unit. The multicast downlink transmission and the unicast downlink transmission can be received by the terminal at the same time or at different times.

In some embodiments, the time unit may be a slot, a sub-slot, or the like. The multicast downlink transmission may be multicast PDSCH or PDCCH transmission. The unicast downlink transmission may be unicast PDSCH or PDCCH transmission.

In an implementation, the base station may schedule the terminal to feed back HARQ-ACK information of multicast PDSCH transmission and unicast PDSCH transmission at a same slot or sub-slot.

It should be noted that the base station may schedule the terminal to feed back HARQ-ACK information of multicast PDSCH transmission and unicast PDSCH transmission at a same slot or sub-slot, which indicates that the base station may instruct, during scheduling, the multicast PDSCH transmission and the unicast PDSCH transmission to feed back HARQ-ACK information in a same time unit, and may also instruct multicast PDSCH transmission and unicast PDSCH transmission to feed back HARQ-ACK information in different time units, that is, it is not limited that the base station needs to schedule the multicast PDSCH and the unicast PDSCH to feed back HARQ-ACK information in different time units. For example, when the base station schedules multicast PDSCH transmission and unicast PDSCH transmission to feed back HARQ-ACK information in different time units, the UE may construct HARQ-ACK codebooks according to respective manners in different time units, determines a feedback resource, and perform transmission.

In the information feedback method according to this embodiment of this application, the terminal may perform HARQ-ACK feedback for multicast downlink transmission and unicast downlink transmission in one time unit. Therefore, when scheduling feedback of HARQ-ACKs for multicast downlink transmission and unicast downlink transmission in a same time unit, the terminal can perform HARQ-ACK feedback for multicast downlink transmission and unicast downlink transmission in the same time unit, thereby improving the effectiveness of the communication system.

In this embodiment of this application, for the multicast downlink transmission (for example, the multicast PDSCH transmission) and the unicast downlink transmission (for example, the unicast PDSCH transmission), the terminal may determine feedback resources (for example, PUCCH resources) respectively, or may determine a same feedback resource (for example, a PUCCH resource). In some embodiments, the process of performing HARQ-ACK feedback for multicast downlink transmission and unicast downlink transmission in step 101 may include: determining, by the terminal) a first feedback resource of the multicast downlink transmission and a second feedback resource of the unicast downlink transmission respectively; and performing HARQ-ACK feedback by using the first feedback resource and the second feedback resource respectively; or the determining, by the terminal, a third feedback resource for the multicast downlink transmission and the unicast downlink transmission; and performing HARQ-ACK feedback by using the third feedback resource.

In this embodiment of this application, when the terminal performs HARQ-ACK feedback for multicast downlink transmission (for example, multicast PDSCH transmission) and unicast downlink transmission (for example, unicast PDSCH transmission), HARQ-ACK codebooks may be respectively constructed for the multicast downlink transmission and the unicast downlink transmission respectively, or one HARQ-ACK codebook may be constructed for the multicast downlink transmission and the unicast downlink transmission, which is described below.

Manner 1

In manner 1, when the terminal feeds back, through scheduling, HARQ-ACK information for multicast downlink transmission and unicast downlink transmission in a same time unit, the terminal may construct HARQ-ACK codebooks respectively for the multicast downlink transmission and the unicast downlink transmission, and respectively determine resources, for example, PUCCH resources, for feeding back the HARQ-ACK information.

In some embodiments, the process of performing HARQ-ACK feedback for multicast downlink transmission and unicast downlink transmission in step 101 may include: constructing a first HARQ-ACK codebook of the multicast downlink transmission and a second HARQ-ACK codebook of the unicast downlink transmission respectively; and performing HARQ-ACK feedback according to the first HARQ-ACK codebook and the second HARQ-ACK codebook.

In some embodiments, the process of performing HARQ-ACK feedback according to the first HARQ-ACK codebook and the second HARQ-ACK codebook may include: performing, by the terminal, transmission of the first HARQ-ACK codebook and transmission of the second HARQ-ACK codebook respectively in a case that a feedback resource of the first HARQ-ACK codebook does not overlap with a feedback resource of the second HARQ-ACK codebook in time domain.

For example, if a first PUCCH resource for the HARQ-ACK of the unicast PDSCH does not overlap with a second PUCCH resource for the HARQ-ACK of the multicast PDSCH in time domain, the terminal may respectively perform transmission of the HARQ-ACK of the unicast PDSCH by using the first PUCCH resource and transmission of the HARQ-ACK of the multicast PDSCH by using a second PUCCH source.

In some embodiments, the process of performing HARQ-ACK feedback according to the first HARQ-ACK codebook and the second HARQ-ACK codebook may include: performing transmission of one codebook in the first HARQ-ACK codebook and the second HARQ-ACK codebook in a case that a feedback resource of the first HARQ-ACK codebook overlaps with a feedback resource of the second HARQ-ACK codebook in time domain. Further, the terminal may discard the other codebook in the first HARQ-ACK codebook and the second HARQ-ACK codebook, or may select another time based on a preset rule, a network configuration, or the like, for transmission of the other codebook.

For example, if a PUCCH resource for the HARQ-ACK of the unicast PDSCH overlaps with a PUCCH resource for the HARQ-ACK of the multicast PDSCH in time domain, the terminal may discard one PUCCH in the PUCCH resources and perform transmission of the other PUCCH.

In some embodiments, when the terminal discards one codebook in the first HARQ-ACK codebook and the second HARQ-ACK codebook, the discarded codebook may be at least one of the following:

1) First HARQ-ACK codebook corresponding to the multicast downlink transmission. In this case, discarding the first HARQ-ACK codebook may be understood as not performing transmission of a feedback, for example, a PUCCH, corresponding to the multicast downlink transmission (for example, multicast PDSCH transmission).

2) Second HARQ-ACK codebook corresponding to the unicast downlink transmission. In this case, discarding the second HARQ-ACK codebook may be understood as not performing transmission of a feedback, for example, a PUCCH, corresponding to the unicast downlink transmission (for example, unicast PDSCH transmission).

3) Discarded HARQ-ACK codebook determined according to a priority of feedback corresponding to the unicast downlink transmission. In this case, discarding a specific HARQ-ACK codebook may be understood as not performing transmission of a feedback, for example, a PUCCH, corresponding to the HARQ-ACK codebook. For example, if a priority of the PUCCH corresponding to the unicast PDSCH is a high priority, the HARQ-ACK feedback of the multicast PDSCH is discarded (for example, not performing transmission of the PUCCH corresponding to the multicast PDSCH); otherwise, the HARQ-ACK codebook of the unicast PDSCH is discarded (for example, not performing transmission of the PUCCH corresponding to the unicast PDSCH).

4) Discarded HARQ-ACK codebook determined according to a priority of feedback corresponding to the multicast downlink transmission. In this case, discarding a specific HARQ-ACK codebook may be understood as not performing transmission of a feedback, for example, a PUCCH, corresponding to the HARQ-ACK codebook. For example, if a priority of the PUCCH corresponding to the multicast PDSCH is a high priority, the HARQ-ACK feedback of the unicast PDSCH is discarded (for example, not performing transmission of the PUCCH corresponding to the unicast PDSCH); otherwise, the HARQ-ACK codebook of the multicast PDSCH is discarded (for example, not performing transmission of the PUCCH corresponding to the multicast PDSCH).

In an implementation, the terminal may determine a discarded HARQ-ACK codebook according to a priority of feedback corresponding to the unicast downlink transmission and a priority of feedback corresponding to the multicast downlink transmission. For example, if the priority of the HARQ-ACK corresponding to the unicast PDSCH and the priority of the HARQ-ACK corresponding to the multicast PDSCH are both high priorities (or both low priorities), HARQ-ACK feedback of the unicast PDSCH can be discarded, or HARQ-ACK feedback of the multicast PDSCH can be discarded, or the specific discarded HARQ-ACK feedback may be determined according to the configuration of the base station or numbers of bits corresponding to the two types of feedback. In another example, if one of the priority of the HARQ-ACK corresponding to the unicast PDSCH and the priority of the HARQ-ACK corresponding to the multicast PDSCH is a high priority, and the other thereof is a low priority, the HARQ-ACK feedback with the low priority can be discarded.

5) Discarded HARQ-ACK codebook determined according to indication of high layer signaling. In this case, discarding a specific HARQ-ACK codebook may be understood as not performing transmission of a feedback, for example, a PUCCH, corresponding to the HARQ-ACK codebook. For example, the base station may instruct, through high layer signaling, the UE to discard the PUCCH corresponding to the multicast PDSCH or discard the PUCCH corresponding to the unicast PDSCH.

6) Discarded HARQ-ACK codebook determined according to priorities of services corresponding to the multicast downlink transmission and the unicast downlink transmission. For example, if a priority of a service corresponding to the multicast PDSCH is higher than a priority of a service corresponding to the unicast PDSCH, the HARQ-ACK codebook of the unicast PDSCH can be discarded, or if a priority of a service corresponding to the multicast PDSCH is lower than a priority of a service corresponding to the unicast PDSCH, the HARQ-ACK codebook of the multicast PDSCH can be discarded. Priorities of services corresponding to the PDSCH may be reported to the base station by the UE.

7) Discarded HARQ-ACK codebook determined according to a number of bits of the first HARQ-ACK codebook and a number of bits of the second HARQ-ACK codebook. For example, the UE may discard a HARQ-ACK codebook with a relatively small number of bits.

In an implementation, in a case that a number of bits of the first HARQ-ACK codebook is the same as a number of bits of the second HARQ-ACK codebook, the UE may determine the discarded HARQ-ACK codebook according to any factor of the foregoing 1) to 5), or determine a specific discarded HARQ-ACK codebook based on the UE.

In some embodiments, the process of performing HARQ-ACK feedback according to the first HARQ-ACK codebook and the second HARQ-ACK codebook may include: multiplexing the first HARQ-ACK codebook and the second HARQ-ACK codebook to a target feedback resource for transmission in a case that a feedback resource of the first HARQ-ACK codebook overlaps with a feedback resource of the second HARQ-ACK codebook in time domain.

For example, if a PUCCH resource for the HARQ-ACK of the unicast PDSCH overlaps with a PUCCH resource for the HARQ-ACK of the multicast PDSCH in time domain, the terminal may multiplex HARQ-ACKs carried on the two PUCCH resources to one PUCCH resource for transmission. That the PUCCH resources overlap with each other in time domain may include that some or all orthogonal frequency division multiplexing (OFDM) time domain symbols of the PUCCH resources overlap with each other.

For example, if the UE can only feed back a NACK for the multicast PDSCH (that is, only when a ratio of NACKs to ACKs in ACKs/NACKs corresponding to PDSCH decoding failures or a plurality of PDSCHs is greater than a specific threshold, the UE feeds back HARQ-ACK information; otherwise, the UE does not feed back HARQ-ACK information), when the UE is scheduled to perform feedback simultaneously for the unicast PDSCH and the multicast PDSCH in a specific time unit, the UE can assume that the HARQ-ACK of the multicast PDSCH is always fed back (for example, the UE feeds back an ACK or a NACK), and determine whether a feedback resource corresponding to the ACK or NACK of the multicast PDSCH overlaps with a feedback resource corresponding to the unicast PDSCH. If the feedback resources do not overlap with each other, and the multicast PDSCH corresponds to an ACK, the UE does not perform transmission of HARQ-ACK information corresponding to the multicast PDSCH. Moreover, if the feedback resources overlap with each other, the UE multiplexes the HARQ-ACK information of the multicast PDSCH and the HARQ-ACK information of the unicast PDSCH for transmission. This method can avoid the problem that the UE and the base station have different understandings of the HARQ-ACK feedback of the UE, thereby avoiding blind detection of the base station.

In an implementation, the target feedback resource may be determined from a target feedback resource set according to indication of the last piece of Downlink Control Information (DCI) corresponding to the unicast downlink transmission (for example, the unicast PDSCH). The target feedback resource set may be a same feedback resource set to which the multicast downlink transmission and the unicast downlink transmission correspond, or may be a feedback resource set to which the unicast downlink transmission corresponds in a case that the multicast downlink transmission and the unicast downlink transmission correspond to different feedback resource sets.

In another implementation, the target feedback resource may be determined from the target feedback resource set, where the target feedback resource set is determined from a feedback resource set corresponding to the unicast downlink transmission based on a number of bits of the multiplexed HARQ-ACK. The target feedback resource may be determined from the target feedback resource set according to indication of the last piece of DCI corresponding to the unicast downlink transmission or according to indication of other DCI, which is not limited herein.

For example, when determining the target PUCCH resource for transmission of the multiplexed HARQ-ACK, the UE may first determine one target PUCCH resource set from a PUCCH resource set corresponding to the unicast PDSCH according to a number of bits of the multiplexed HARQ-ACK, and then, determine the target PUCCH resource from the target PUCCH resource set according to indication of the last piece of DCI corresponding to the unicast PDSCH (for example, a PUCCH resource indicator (PRI) or the first CCE index corresponding to the PRI and the DCI).

Manner 2

In manner 2, when the terminal feeds back, through scheduling, HARQ-ACK information for multicast downlink transmission (for example, a multicast PDSCH) and unicast downlink transmission (for example, a unicast PDSCH) in a same time unit, the terminal may construct one HARQ-ACK codebook for the multicast downlink transmission and the unicast downlink transmission, and determine a resource, for example, a PUCCH resource, for feeding back the HARQ-ACK information.

In some embodiments, the process of performing HARQ-ACK feedback for multicast downlink transmission and unicast downlink transmission in step 101 may include: constructing a third HARQ-ACK codebook for the multicast downlink transmission and the unicast downlink transmission; and performing transmission of the third HARQ-ACK codebook.

In an implementation, the process of performing transmission of the third HARQ-ACK codebook may include: performing transmission of the third HARQ-ACK codebook on a target feedback resource. The target feedback resource is determined from a target feedback resource set according to indication of the last piece of DCI corresponding to the unicast downlink transmission (for example, the unicast PDSCH). The target feedback resource set may be a same feedback resource set to which the multicast downlink transmission and the unicast downlink transmission correspond, or may be a feedback resource set to which the unicast downlink transmission corresponds in a case that the multicast downlink transmission and the unicast downlink transmission correspond to different feedback resource sets.

In another implementation, the process of performing transmission of the third HARQ-ACK codebook may include: performing transmission of the third HARQ-ACK codebook on a target feedback resource. The target feedback resource is determined from the target feedback resource set, where the target feedback resource set is determined from a feedback resource set corresponding to the unicast downlink transmission based on a number of bits of the third HARQ-ACK codebook. The target feedback resource may be determined from the target feedback resource set according to indication of the last piece of DCI corresponding to the unicast downlink transmission or according to indication of other DCI, which is not limited herein.

For example, if the UE can only feed back a NACK for the multicast PDSCH (that is, only when a ratio of NACKs to ACKs in ACKs/NACKs corresponding to PDSCH decoding failures or a plurality of PDSCHs is greater than a specific threshold, the UE feeds back HARQ-ACK information), in a case that one HARQ-ACK codebook is constructed for the multicast PDSCH and the unicast PDSCH, when the UE is scheduled to perform feedback simultaneously for the unicast PDSCH and the multicast PDSCH in a specific time unit, to avoid blind detection of the base station, in the time unit, regardless of whether the multicast PDSCH corresponds to an ACK or a NACK, the UE always feeds back a HARQ-ACK of the multicast PDSCH (for example, the UE feeds back an ACK or a NACK).

In this embodiment of this application, when the third HARQ-ACK codebook is constructed for the multicast downlink transmission and the unicast downlink transmission, the third HARQ-ACK codebook, for example, may be a type 1 semi-persistent codebook or a type 2 dynamic codebook.

For the type 1 semi-persistent codebook, the process of constructing a third HARQ-ACK codebook may include: determining a union of a first candidate PDSCH reception opportunity corresponding to the multicast downlink transmission and a second candidate PDSCH reception opportunity corresponding to the unicast downlink transmission; and constructing the third HARQ-ACK codebook according to the union of the first candidate PDSCH reception opportunity and the second candidate PDSCH reception opportunity.

For example, if TDRA forms of multicast PDSCH and the unicast PDSCH are respectively configured or defined, when determining a union of candidate PDSCH reception opportunities corresponding to the multicast PDSCH and the unicast PDSCH, the UE may obtain a union of the TDRA forms of the multicast PDSCH and the unicast PDSCH. In another example, if k1 sets of the multicast PDSCH and the unicast PDSCH are respectively configured or defined, when determining a union of candidate PDSCH reception opportunities corresponding to the multicast PDSCH and the unicast PDSCH, the UE may obtain a union of k1 sets of the multicast PDSCH and the unicast PDSCH. In another example, if k1 sets of the multicast PDSCH and the unicast PDSCH are respectively configured or defined, and TDRA forms of multicast PDSCH and the unicast PDSCH are respectively configured or defined, when determining a union of candidate PDSCH reception opportunities corresponding to the multicast PDSCH and the unicast PDSCH, the UE may obtain a union of k1 sets of the multicast PDSCH and the unicast PDSCH and obtain a union of the TDRA forms of the multicast PDSCH and the unicast PDSCH.

In some embodiments, the third HARQ-ACK codebook may include first HARQ-ACK information of the multicast downlink transmission and second HARQ-ACK information of the unicast downlink transmission. The first HARQ-ACK information may be fed back in a non-aggregated form or fed back in an aggregated form.

In an implementation, if a HARQ-ACK feedback mode of the multicast PDSCH may be aggregated feedback (that is, the UE feeds back 1-bit HARQ-ACK information for a plurality of PDSCHs, for example, if a ratio of ACKs to NACKs corresponding to a plurality of pieces of PDSCH feedback is greater than a specific threshold, the UE feeds back an ACK; otherwise, the UE feeds back a NACK), then case 1: if the UE schedules to simultaneously feed back HARQ-ACKs of both the multicast PDSCH and the unicast PDSCH in a same time unit, then the HARQ-ACK of the multicast PDSCH is fed back in a non-aggregated form (that is, aggregated feedback is only applicable to only performing feedback for the multicast PDSCH in a specific time unit); and case 2: if the UE is scheduled to feed back HARQ-ACKs of both the multicast PDSCH and the unicast PDSCH in a same time unit, then the UE can feed back aggregated ACK/NACK information at a plurality of HARQ-ACK positions corresponding to candidate PDSCH reception opportunities corresponding to the aggregated plurality of multicast PDSCHs (same information is repeated at a plurality of positions), or the UE can feed back aggregated ACK/NACK information at a HARQ-ACK position corresponding to one (for example, the first one, the last one, or a predefined one) of candidate PDSCH reception opportunities in the aggregated PDSCHs and pad the remaining positions with NACK information.

In addition, if the multicast downlink transmission and the unicast downlink transmission support Frequency-Division Multiplexing (FDM), that is, the UE may receive the multicast PDSCH and the unicast PDSCH simultaneously on a same time domain resource and different frequency domain resources, the process of constructing the third HARQ-ACK codebook may further include: determining a first candidate PDSCH reception opportunity corresponding to the multicast downlink transmission and a second candidate PDSCH reception opportunity corresponding to the unicast downlink transmission respectively; constructing a first HARQ-ACK (sub-)codebook of the multicast downlink transmission and a second HARQ-ACK (sub-)codebook of the unicast downlink transmission respectively according to the first candidate PDSCH reception opportunity and the second candidate PDSCH reception opportunity; and concatenating the first HARQ-ACK (sub-)codebook and the second HARQ-ACK (sub-)codebook as the third HARQ-ACK codebook. The "determining a first candidate PDSCH reception opportunity corresponding to the multicast downlink transmission and a second candidate PDSCH reception opportunity corresponding to the unicast downlink transmission respectively" does not force the terminal or UE to perform two processes of determining a candidate PDSCH reception opportunity. For example, when the multicast downlink transmission and the unicast downlink transmission correspond to a same TDRA form and a same k1 set, and the second candidate PDSCH reception opportunity is the same as the first candidate PDSCH reception opportunity, when determining the first candidate PDSCH reception opportunity and the second candidate PDSCH reception opportunity, the UE only needs to perform determining once.

In some embodiments, a feedback type of the first HARQ-ACK sub-codebook may be different from a feedback type of the second HARQ-ACK (sub-)codebook. For example, if the multicast PDSCH and the unicast PDSCH support FDM, that is, the UE may receive the multicast PDSCH and the unicast PDSCH simultaneously on a same time domain resource and different frequency domain resources, the UE can construct HARQ-ACK (sub-)codebooks of the multicast PDSCH and the unicast PDSCH respectively, and concatenate the two HARQ-ACK (sub-)codebooks to form the final codebook. In this case, the HARQ-ACK codebooks of the multicast PDSCH and the unicast PDSCH are not required to be of the same type (for example, both are the type 1 semi-persistent codebook). For the multicast PDSCH corresponds to the type 1 semi-persistent codebook and the unicast PDSCH corresponds to the type 2 dynamic codebook.

In some embodiments, the first HARQ-ACK (sub-)codebook may be an aggregated HARQ-ACK feedback type.

For the type 2 dynamic codebook, the process of constructing the third HARQ-ACK codebook may include: constructing a first HARQ-ACK (sub-)codebook of the multicast downlink transmission and a second HARQ-ACK (sub-)codebook of the unicast downlink transmission respectively according to a DAI corresponding to the multicast downlink transmission and a DAI corresponding to the unicast downlink transmission; and concatenating the first HARQ-ACK (sub-)codebook and the second HARQ-ACK (sub-)codebook as the third HARQ-ACK codebook. In this case, the DAIs of the multicast downlink transmission and the unicast downlink transmission may be accumulated respectively. This method may be applied to a scenario in which the multicast PDSCH is scheduled by using a multicast DCI.

For example, if the UE can only feed back a NACK for the multicast PDSCH (that is, only when a ratio of NACKs to ACKs in ACKs/NACKs corresponding to PDSCH decoding failures or a plurality of PDSCHs is greater than a specific threshold, the UE feeds back HARQ-ACK information), in a case that a dynamic HARQ-ACK codebook is constructed, when the UE is scheduled to perform feedback simultaneously for the unicast PDSCH and the multicast PDSCH in a specific time unit, to avoid blind detection of the base station, the UE always feeds back a HARQ-ACK of the multicast PDSCH (for example, the UE feeds back an ACK or a NACK).

This application is described below in detail with reference to specific embodiments.

Embodiment 1

In this embodiment, as shown in FIG. 2A and FIG. 2B, DCI 1 to DCI 5 are respectively used for scheduling PDSCH 1 to PDSCH 5, and according to the PDSCH to HARQ feedback timing indication information, pieces of HARQ- ACK information of PDSCH 1 to PDSCH 5 are all fed back in a slot n1. Assuming that PDSCH 1, PDSCH 3, and PDSCH 4 are multicast PDSCHs, and PDSCH 2 and PDSCH 5 are unicast PDSCHs, the multicast PDSCHs are scheduled by using the multicast DCI, and the unicast PDSCHs are scheduled by using the unicast DCI. The UE may determine whether a PDSCH is a multicast PDSCH or a unicast PDSCH by using a DCI format, a Radio Network Temporary Identity (RNTI), a Control Resource Set (CORE-SET), a search space, or the like.

In an implementation, HARQ-ACK codebooks of the multicast PDSCH and the unicast PDSCH are respectively constructed (HARQ-ACK feedback manners corresponding to the multicast PDSCH and the unicast PDSCH may be configured respectively or in a unified manner), to determine corresponding PUCCH resources respectively. As shown in FIG. 2A, PUCCH 1 and PUCCH 2 are respectively HARQ-ACK PUCCHs corresponding to the unicast PDSCH and the multicast PDSCH. If the HARQ-ACK feedback manners corresponding to the multicast PDSCH and the unicast PDSCH are both dynamic feedback, for the multicast PDSCH, if DCI corresponding to the multicast PDSCH includes a DAI field, DAIs of the multicast PDSCH (if any) and the unicast PDSCH need to be accumulated respectively. That is, only scheduling of the multicast PDSCH is accumulated by the DAI in the DCI of the multicast PDSCH, and only scheduling of the unicast PDSCH is accumulated by the DAI in the DCI of the unicast PDSCH (it should be noted that, if the multicast PDSCH is not scheduled by using the DCI or the DCI does not include a DAI, the DAI can only be accumulated in the unicast PDSCH).

In an implementation, if a PUCCH resource for feeding back a HARQ-ACK of the multicast PDSCH does not overlap with a PUCCH resource for feeding back a HARQ-ACK of the unicast PDSCH in time domain, the UE perform transmission of corresponding HARQ-ACK codebooks on the two PUCCH resources respectively.

One manner is to not allow the base station to schedule the two PUCCH resources to overlap with each other.

Another manner is to allow the base station to schedule the two PUCCH resources to overlap with each other. If time domain resources of two PUCCHs overlap with each other, or the time domain resources of the two PUCCHs do not overlap with each other, the two PUCCHs are both long-format PUCCHs. In addition, when the UE performs transmission of two PUCCHs in one slot, at least one of the PUCCHs is a short-format PUCCH.

Case 1: The UE discards one of the PUCCHs or Uplink Control Information (UCI) carried thereon, and performs transmission of the other PUCCH and UCI carried thereon. For example, at least one of the following manners may be selected:

1) The UE discards a PUCCH corresponding to the multicast PDSCH.

2) The UE discards a PUCCH corresponding to the unicast PDSCH.

3) Which PUCCH is discarded is determined according to a priority of a HARQ-ACK corresponding to the unicast PDSCH.

For example, if the priority of the HARQ-ACK corresponding to the unicast PDSCH is a high priority, the PUCCH corresponding to the multicast PDSCH is discarded; otherwise, the PUCCH corresponding to the unicast PDSCH is discarded.

4) Which PUCCH is discarded is determined according to a priority of a HARQ-ACK corresponding to the multicast PDSCH.

For example, if the priority of the HARQ-ACK corresponding to the multicast PDSCH is a high priority, the PUCCH corresponding to the unicast PDSCH is discarded; otherwise, the PUCCH corresponding to the multicast PDSCH is discarded.

In an implementation, the terminal may determine, according to a priority of a HARQ-ACK corresponding to the unicast PDSCH and a priority of a HARQ-ACK corresponding to the multicast PDSCH, which PUCCH is discarded. For example, if the priority of the HARQ-ACK corresponding to the unicast PDSCH and the priority of the HARQ-ACK corresponding to the multicast PDSCH are both high priorities (or both low priorities), HARQ-ACK feedback of the unicast PDSCH can be discarded, or HARQ-ACK feedback of the multicast PDSCH can be discarded, or the specific discarded HARQ-ACK feedback may be determined according to the configuration of the base station or numbers of bits corresponding to the two types of feedback. In another example, if one of the priority of the HARQ-ACK corresponding to the unicast PDSCH and the priority of the HARQ-ACK corresponding to the multicast PDSCH is a high priority, and the other thereof is a low priority, the HARQ-ACK feedback with the low priority can be discarded.

5) The base station instructs, through high layer signaling, the UE to discard which PUCCH.

6) The UE determines, according to priorities of services corresponding to PDSCHs, which PUCCH is discarded.

7) The UE determines, according to a number of bits of a HARQ-ACK carried by each PUCCH, which PUCCH is discarded. For example, the UE discards a PUCCH of which a number of bits is relatively small.

Case 2: The UE multiplexes HARQ-ACKs carried by two PUCCHs to one PUCCH resource for transmission.

For example, if PUCCH resource sets of HARQ-ACK feedback for the multicast PDSCH and the unicast PDSCH are configured respectively, the multiplexed PUCCH resource is selected from the PUCCH resource set corresponding to the unicast PDSCH. That is, the UE may determine a PUCCH resource set from PUCCH resource sets corresponding to the unicast PDSCH according to the multiplexed HARQ-ACK bit, and determines a PUCCH resource from the determined PUCCH resource set according to a PUCCH resource indicator PRI (and/or an index of the first Control Channel Element (CCE) of the DCI) of the last piece of DCI, where the last piece of DCI is the last one of pieces of DCI corresponding to the unicast PDSCH.

For example, in case 2, the UE may concatenate a HARQ-ACK codebook corresponding to the unicast PDSCH and a HARQ-ACK codebook corresponding to the multicast PDSCH. For example, the HARQ-ACK codebook of the multicast PDSCH is behind the HARQ-ACK codebook of the unicast PDSCH.

It should be noted that, if for the multicast PDSCH, a HARQ-ACK feedback mode thereof may be that the UE only feeds back HARQ-ACK information when PDSCH decoding fails, and does not feed back HARQ-ACK information when PDSCH decoding succeeds, or if a plurality of multicast PDSCHs perform feedback in a same time unit, a NACK/ACK ratio is determined according to ACKs/NACKs corresponding to each PDSCH, and if the ratio exceeds a specific threshold, the UE feeds back HAQ-ACK information; otherwise, the UE does not feed back HARQ-ACK information. In this mode, the base station schedules the UE to perform feedback for the multicast PDSCH and the unicast PDSCH in a specific time unit. Because whether a HARQ-ACK PUCCH of the multicast PDSCH exists depends on reception of the PDSCH, the base station is uncertain about whether the HARQ-ACK PUCCH of the multicast PDSCH is multiplexed with the HARQ-ACK PUCCH of the unicast PDSCH (assuming that when the UE feeds back HARQ-ACK information of the multicast PDSCH, a PUCCH resource thereof overlaps with a PUCCH resource of the unicast PDSCH). In this case, the base station can determine, through blind detection, whether the UE feeds back a HARQ-ACK of the multicast PDSCH.

On the other hand, to avoid blind detection of the base station, on the UE end, if in a specific time unit, the UE is scheduled to feed back HARQ-ACKs of the multicast PDSCH and the unicast PDSCH, then:

Method 1: The UE is assumed to always feed back a HARQ-ACK (that is, feed back a NACK or an ACK) of the multicast PDSCH, and determine a corresponding PUCCH resource. If the resource does not overlap with a resource corresponding to the unicast PDSCH, the UE does not perform transmission of a PUCCH corresponding to the multicast PDSCH. Moreover, if the resource overlaps with the resource corresponding to the unicast PDSCH, the UE performs transmission of the HARQ-ACK information through multiplexing.

Method 2: The UE always adds X bits after/before HARQ-ACK information of the unicast PDSCH, where X is equal to the maximum number of bits of the HARQ-ACK of the multicast PDSCH that the UE needs to feed back in the time unit (for example, for the multicast PDSCH, if a NACK fed back by the UE is 1 bit, and no feedback indicates 0 bit, then X=1). If the multicast PDSCH has corresponding feedback in the time unit (that is, the HARQ-ACK feedback corresponding to the multicast PDSCH is a NACK), then information content of the X bits is the HARQ-ACK information corresponding to the multicast PDSCH; otherwise, the UE performs padding with the X bits.

In another implementation, the UE constructs (sub-)codebooks of the multicast PDSCH and the unicast PDSCH respectively (HARQ-ACK feedback manners corresponding to the multicast PDSCH and the unicast PDSCH may be configured respectively or in a unified manner), concatenates the two (sub-)codebooks together, and determines a corresponding PUCCH resource according to a number of bits of the HARQ-ACK after concatenation. As shown in FIG. 2B, PUCCH 3 is a PUCCH that feeds back HARQ-ACKs corresponding to the unicast PDSCH and the multicast PDSCH. When determining the PUCCH resource, the UE may determine the PUCCH resource according to indication the PRI of the last piece of DCI corresponding to the unicast PDSCH.

Similarly, in this manner, if for the multicast PDSCH, a HARQ-ACK feedback mode thereof may be that the UE only feeds back HARQ-ACK information when PDSCH decoding fails, and does not feed back HARQ-ACK information when PDSCH decoding succeeds, or if a plurality of multicast PDSCHs perform feedback in a same time unit, a NACK/ACK ratio is determined according to ACKs/NACKs corresponding to each PDSCH, and if the ratio exceeds a specific threshold, the UE feeds back HAQ-ACK information; otherwise, the UE does not feed back HARQ-ACK information. In this mode, the base station schedules the UE to perform feedback for the multicast PDSCH and the unicast PDSCH in a specific time unit. Because whether a HARQ-ACK PUCCH of the multicast PDSCH exists depends on reception of the PDSCH, the base station is uncertain about whether the HARQ-ACK PUCCH of the multicast PDSCH is multiplexed with the HARQ-ACK PUCCH of the unicast PDSCH, and therefore, is uncertain about a number of bits of a HARQ-ACK fed back by the UE and a corresponding PUCCH resource. In this case, the base station can determine, through blind detection, whether the UE feeds back a HARQ-ACK of the multicast PDSCH. In some embodiments, the UE always adds X bits after/before HARQ-ACK information of the unicast PDSCH (for example, method 2 described above).

In the foregoing implementations, the base station is always allowed to schedule the multicast PDSCH and the unicast PDSCH to feedback HARQ-ACKs in the same slot/sub-slot. In another implementation, when the base station schedules the multicast PDSCH and the unicast PDSCH, the multicast PDSCH and the unicast PDSCH feed back HARQ-ACKs in different slots/sub-slots, but cannot be scheduled to perform feedback in a same slot/sub-slot. For example, when the base station schedules PDSCH 1 to PDSCH 5, multicast PDSCHs 1, 3, and 4 unicast PDSCHs 2 and 5 are caused by PDSCH to HARQ feedback timing indication information to perform feedback in different slots. Under this method, the UE feeds back the HARQ-ACKs of the multicast PDSCH and the unicast PDSCH in different time units respectively, and can determine codebooks and resources according to their respective manners without affecting each other.

Embodiment 2

For a type 1 HARQ-ACK codebook, the UE needs to determine a candidate PDSCH reception opportunity according to a TDRA form and a k1 set of a PDSCH, and determine bit information and a number of bits of a HARQ-ACK according to the candidate PDSCH reception opportunity.

In some embodiments, the UE may determine the candidate PDSCH reception opportunity according to the following factors: 1) a k1 set associated with an active uplink UL Bandwidth Part (BWP); 2) a TDRA form of a PDSCH; 3) subcarrier spacings of uplink/downlink BWPs; and 4) semi-persistent uplink and downlink configurations.

For example, the UE may determine a feedback window of a HARQ-ACK according to the k1 set, as shown in FIG. 3A, the k1 set is {5, 6, 7}. The candidate PDSCH reception opportunity is determined in a slot corresponding to each k1 according to the TDRA form of the PDSCH and the semi-persistent uplink and downlink configurations. As shown in FIG. 3B, for a specific row in the TDRA form, if any symbol at a time domain position thereof is configured as an uplink symbol, the corresponding candidate PDSCH reception opportunity is removed. If time domain positions of different rows overlap with each other, there is only one corresponding HARQ-ACK bit position, that is, candidate PDSCH reception opportunities that overlap each other are merged.

For example, referring to FIG. 3B and FIG. 3C, when the UE feeds back a HARQ-ACK in a slot n+9, for k1=6, which corresponds to PDSCH scheduling of a slot n+3, because some symbols of candidate PDSCH reception opportunities corresponding to row indexes 2, 3, and 8 in the TDRA form are UL symbols, the candidate PDSCH reception opportunities corresponding to the row indexes 2, 3, 8 in the TDRA form are excluded. The remaining row indexes (RI) include RI 0, RI 1, RI 4, RI 5, and RI 6, but because candidate PDSCH reception opportunities corresponding to RI 0 and RI 4 overlap with each other in time domain, and candidate PDSCH reception opportunities corresponding to RI 1 and RI 5 overlap with each other in time domain, the candidate PDSCH reception opportunities need to be merged. That is, the PDSCHs corresponding to RI 0 and RI 4 correspond to one HARQ-ACK bit position, and RI 1 and RI 5/RI 6 correspond to one reception opportunity. In this way, there are 4 candidate PDSCH reception opportunities in the slot n+3.

Moreover, k=5 or k=7 corresponds to slots n+4 and n+2 respectively, because the two slots are not configured with uplink symbols, no candidate PDSCH reception opportunity needs to be excluded according to the semi-persistent uplink and downlink configurations, and only candidate PDSCH reception opportunities that overlap with each other need to be merged. Similarly, because candidate PDSCH reception opportunities corresponding to RI 3 and RI 0 overlap with each other in time domain, and candidate PDSCH reception opportunities corresponding to RI 0 and RI 4 overlap with each other in time domain, the candidate PDSCH reception opportunities need to be merged. That is, the PDSCHs corresponding to RI 0 and RI 4 correspond to one HARQ-ACK bit position, and RI 3, RI 0, and RI 4 correspond to a same bit position in the HARQ-ACK codebook. Because candidate PDSCH reception opportunities corresponding to RI 1 and RI 5 overlap with each other in time domain, RI 1 and RI 5/RI 6 correspond to one reception opportunity. Candidate PDSCH reception opportunities corresponding to RI 2 and RI 7 overlap with each other in time domain, the candidate PDSCH reception opportunities need to be merged. That is, the PDSCHs corresponding to RI 2 and RI 7 correspond to one HARQ-ACK bit position. In this way, both slots n+2 and n+4 respectively have 5 candidate PDSCH reception opportunities. Therefore, in a slot n+9, the UE needs to feed back HARQ-ACKs corresponding to 14 candidate PDSCH reception opportunities. If each PDSCH has only one TB, or each PDSCH may correspond to two TBs, but the UE configures HARQ-ACK spatial bundling, for example, harq-ACK-SpatialBundlingPUCCH, each candidate PDSCH reception opportunity in the 14 candidate PDSCH reception opportunities corresponds to 1-bit HARQ-ACK information, that is, the UE needs to feed back 14-bit HARQ-ACK information.

In one implementation, if the multicast PDSCH and the unicast PDSCH correspond to the same k1 set and the same TDRA form, the UE can determine a PDSCH reception opportunity and a HARQ-ACK codebook in an existing manner, and does not need to distinguish between the multicast PDSCH and the unicast PDSCH.

In another implementation, if the HARQ-ACK feedback manner corresponding to the multicast PDSCH is aggregated HARQ-ACK feedback, the UE may feed back 1-bit HARQ-ACK information for a plurality of PDSCHs. For example, as shown in 4, if PDSCH 1, PDSCH 2, and PDSCH 3 are all multicast PDSCHs, and it indicates that HARQ-ACKs are fed back in a same slot, the UE only needs to feed back 1-bit HARQ-ACK information for PDSCH 1, PDSCH 2, and PDSCH 3.

In the type 1 semi-persistent codebook, because each PDSCH has a corresponding HARQ-ACK feedback position, on the one hand, the UE does not need to adopt an aggregated form, and therefore, the UE can feed back corresponding HARQ-ACK information for each PDSCH, and the corresponding aggregation manner is only applicable to a specific time unit when the UE only needs to perform feedback for the multicast PDSCH; and on the other hand, the UE can still perform feedback in an aggregated form to feed back the same content (that is, the aggregated HARQ-ACK information) at HARQ-ACK positions corresponding to a plurality of PDSCH reception opportunities, or feed back the aggregated HARQ-ACK information at one of the positions (such as the first one or the last one), and pad the remaining positions with bits.

Figure 5:
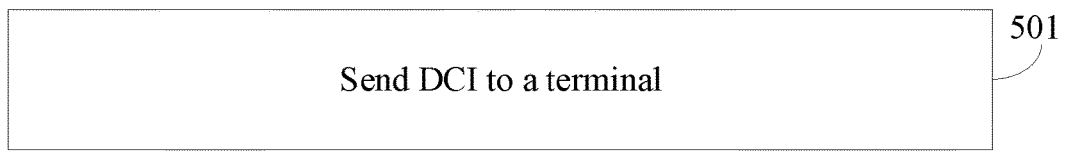
FIG. 5 is a flowchart of a resource scheduling method according to an embodiment of this application.

FIG. 5 is a flowchart of a resource scheduling method according to an embodiment of this application. The method is applied to a network device. As shown in FIG. 5, the method includes the following steps:

Step 501: Send DCI to a terminal.

In some embodiments, the DCI is used for scheduling the terminal to feed back HARQ-ACK information of multicast downlink transmission and unicast downlink transmission only in different time units. The time unit may be, for example, a slot or a sub-slot. In this case, the multicast downlink transmission and the unicast downlink transmission need to be scheduled for feedback in different time units. The terminal does not expect to perform feedback in the same time unit, and the terminal can construct codebooks, determines resources, performs feedback, and the like respectively in different time units.

For example, the base station can only schedule the multicast PDSCH and the unicast PDSCH to feed back HARQ-ACKs in different slots/sub-slots. That is, the base station cannot schedule the multicast PDSCH and the unicast PDSCH to feed back HARQ-ACKs in the same slot/sub-slot.

In some embodiments, the DCI is used for scheduling the terminal to feed back HARQ-ACK information of multicast downlink transmission and unicast downlink transmission in different time units or on non-overlapping uplink resources (UL resources) in a same time unit. The time unit may be, for example, a slot or a sub-slot. In this case, the multicast downlink transmission and the unicast downlink transmission may be scheduled for feedback in different time units, or may be scheduled for feedback on non-overlapping uplink resources in a same time unit. Moreover, for the method in which the terminal performs feedback for multicast downlink transmission and unicast downlink transmission in a same time unit, reference may be made to the foregoing embodiments, and details are not described herein. In addition, the DCI is used for scheduling the terminal to feed back HARQ-ACK information of multicast downlink transmission and unicast downlink transmission on non-overlapping uplink resources.

For example, the base station may schedule the multicast PDSCH and the unicast PDSCH to feed back HARQ-ACKs on UL resources in a same slot/sub-slot and may also schedule the multicast PDSCH and the unicast PDSCH to feed back HARQ-ACK in different slots/sub-slots.

It can be understood that the DCI sent to the terminal includes at least multicast DCI for scheduling the multicast downlink transmission and unicast DCI for scheduling unicast downlink transmission.

Therefore, as scheduled by the network device, the terminal may perform corresponding HARQ-ACK feedback for multicast downlink transmission and unicast downlink transmission, thereby improving the effectiveness of the communication system.

Figure 6:
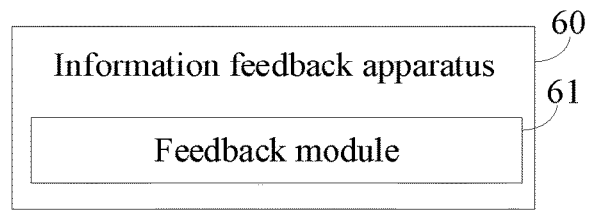
FIG. 6 is a schematic structural diagram of an information feedback apparatus according to an embodiment of this application.

FIG. 6 is a schematic structural diagram of an information feedback apparatus according to an embodiment of this application. The apparatus is applied to a terminal. As shown in FIG. 6, the information feedback apparatus 60 includes:

a feedback module 61, configured to perform HARQ-ACK feedback for multicast downlink transmission and unicast downlink transmission in one time unit.

In some embodiments, the feedback module 61 includes:

a first construction unit, configured to construct a first HARQ-ACK codebook of the multicast downlink transmission and a second HARQ-ACK codebook of the unicast downlink transmission respectively; and a first feedback unit, configured to perform HARQ-ACK feedback according to the first HARQ-ACK codebook and the second HARQ-ACK codebook.

In some embodiments, the first feedback unit is further configured to:

perform transmission of one codebook in the first HARQ-ACK codebook and the second HARQ-ACK codebook in a case that a feedback resource of the first HARQ-ACK codebook overlaps with a feedback resource of the second HARQ-ACK codebook in time domain.

In some embodiments, the apparatus further includes:

a processing module, configured to discard the other codebook in the first HARQ-ACK codebook and the second HARQ-ACK codebook, where the discarded codebook is at least one of the following:

the first HARQ-ACK codebook corresponding to the multicast downlink transmission;

the second HARQ-ACK codebook corresponding to the unicast downlink transmission;

a discarded HARQ-ACK codebook determined according to a priority of feedback corresponding to the unicast downlink transmission;

a discarded HARQ-ACK codebook determined according to a priority of feedback corresponding to the multicast downlink transmission;

a discarded HARQ-ACK codebook determined according to a priority of feedback corresponding to the unicast downlink transmission and a priority of feedback corresponding to the multicast downlink transmission;

a discarded HARQ-ACK codebook determined according to indication of high layer signaling;

a discarded HARQ-ACK codebook determined according to priorities of services corresponding to the multicast downlink transmission and the unicast downlink transmission; or a discarded HARQ-ACK codebook determined according to a number of bits of the first HARQ-ACK codebook and a number of bits of the second HARQ-ACK codebook.

In some embodiments, the first feedback unit is further configured to:

multiplexing the first HARQ-ACK codebook and the second HARQ-ACK codebook to a target feedback resource for transmission in a case that a feedback resource of the first HARQ-ACK codebook overlaps with a feedback resource of the second HARQ-ACK codebook in time domain.

In some embodiments, the target feedback resource is determined from a target feedback resource set according to indication of the last piece of DCI corresponding to the unicast downlink transmission.

In some embodiments, the target feedback resource is determined from the target feedback resource set, where the target feedback resource set is determined from a feedback resource set corresponding to the unicast downlink transmission based on a number of bits of the multiplexed HARQ-ACK.

In some embodiments, the first feedback unit is further configured to:

performing transmission of the first HARQ-ACK codebook and transmission of the second HARQ-ACK codebook respectively in a case that a feedback resource of the first HARQ-ACK codebook does not overlap with a feedback resource of the second HARQ-ACK codebook in time domain.

In some embodiments, the feedback module 61 may include:

a second construction unit, configured to construct a third HARQ-ACK codebook for the multicast downlink transmission and the unicast downlink transmission; and a second feedback unit, configured to perform transmission of the third HARQ-ACK codebook.

In some embodiments, the second feedback unit is further configured to: perform transmission of the third HARQ-ACK codebook on a target feedback resource. The target feedback resource is determined from a target feedback resource set according to indication of the last piece of DCI corresponding to the unicast downlink transmission.

In some embodiments, the second feedback unit is further configured to: perform transmission of the third HARQ-ACK codebook on a target feedback resource. The target feedback resource is determined from the target feedback resource set, where the target feedback resource set is determined from a feedback resource set corresponding to the unicast downlink transmission based on a number of bits of the third HARQ-ACK codebook.

In some embodiments, the second construction unit includes:

a first determining subunit, configured to determine a union of a first candidate PDSCH reception opportunity corresponding to the multicast downlink transmission and a second candidate PDSCH reception opportunity corresponding to the unicast downlink transmission; and a first construction subunit, configured to construct the third HARQ-ACK codebook according to the union of the first candidate PDSCH reception opportunity and the second candidate PDSCH reception opportunity.

In some embodiments, the second construction unit includes:

a second determining subunit, configured to determine a first candidate PDSCH reception opportunity corresponding to the multicast downlink transmission and a second candidate PDSCH reception opportunity corresponding to the unicast downlink transmission respectively; and a second construction subunit, configured to construct a first HARQ-ACK sub-codebook of the multicast downlink transmission and a second HARQ-ACK sub-codebook of the unicast downlink transmission respectively according to the first candidate PDSCH reception opportunity and the second candidate PDSCH reception opportunity; and a processing subunit, configured to concatenate the first HARQ-ACK sub-codebook and the second HARQ-ACK sub-codebook as the third HARQ-ACK codebook.

In some embodiments, the third HARQ-ACK codebook includes first HARQ-ACK information of the multicast downlink transmission and second HARQ-ACK information of the unicast downlink transmission, where the first HARQ-ACK information is fed back in a non-aggregated form; or the first HARQ-ACK information is fed back in an aggregated form.

In some embodiments, the feedback module 61 may include:

a first determining unit, configured to determine a first feedback resource of the multicast downlink transmission and a second feedback resource of the unicast downlink transmission respectively; and a third feedback unit, configured to perform HARQ-ACK feedback by using the first feedback resource and the second feedback resource respectively.

In some embodiments, the feedback module 61 may include:

a second determining unit, configured to determine a third feedback resource for the multicast downlink transmission and the unicast downlink transmission; and a fourth feedback unit, configured to perform HARQ-ACK feedback by using the third feedback resource.

It may be understood that, the information feedback apparatus 61 in this embodiment of this application may implement processes implemented in the method embodiment shown in FIG. 1. To avoid repetition, details are not described herein again.

Figure 7:
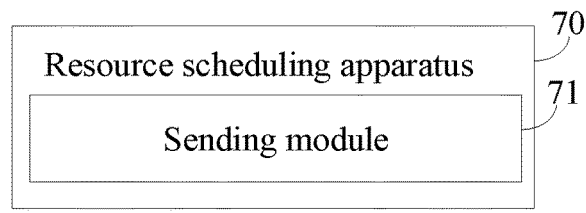
FIG. 7 is a schematic structural diagram of a resource scheduling apparatus according to an embodiment of this application.

FIG. 7 is a schematic structural diagram of a resource scheduling apparatus according to an embodiment of this application. The apparatus is applied to a network device. As shown in FIG. 7, the resource scheduling apparatus 70 includes:

a sending module 71, configured to send DCI to a terminal.

The DCI is used for scheduling the terminal to feed back HARQ-ACK information of multicast downlink transmission and unicast downlink transmission only in different time units.

In some embodiments, the DCI is used for scheduling the terminal to feed back HARQ-ACK information of multicast downlink transmission and unicast downlink transmission in different time units or on non-overlapping uplink resources in a same time unit.

In some embodiments, the DCI is used for scheduling the terminal to feed back HARQ-ACK information of multicast downlink transmission and unicast downlink transmission on non-overlapping uplink resources.

It may be understood that, the information feedback apparatus 71 in this embodiment of this application may implement processes implemented in the method embodiment shown in FIG. 5. To avoid repetition, details are not described herein again.

In some embodiments, the embodiments of this application further provide a communication device, including a processor, a memory, and a computer program stored in the memory and executable on the processor, where when executed by the processor, the computer program implements processes of the embodiments of the information feedback method or implements processes of the embodiments of the resource scheduling method, and can achieve the same technical effects. To avoid repetition, details are not described herein again.

Figure 8:
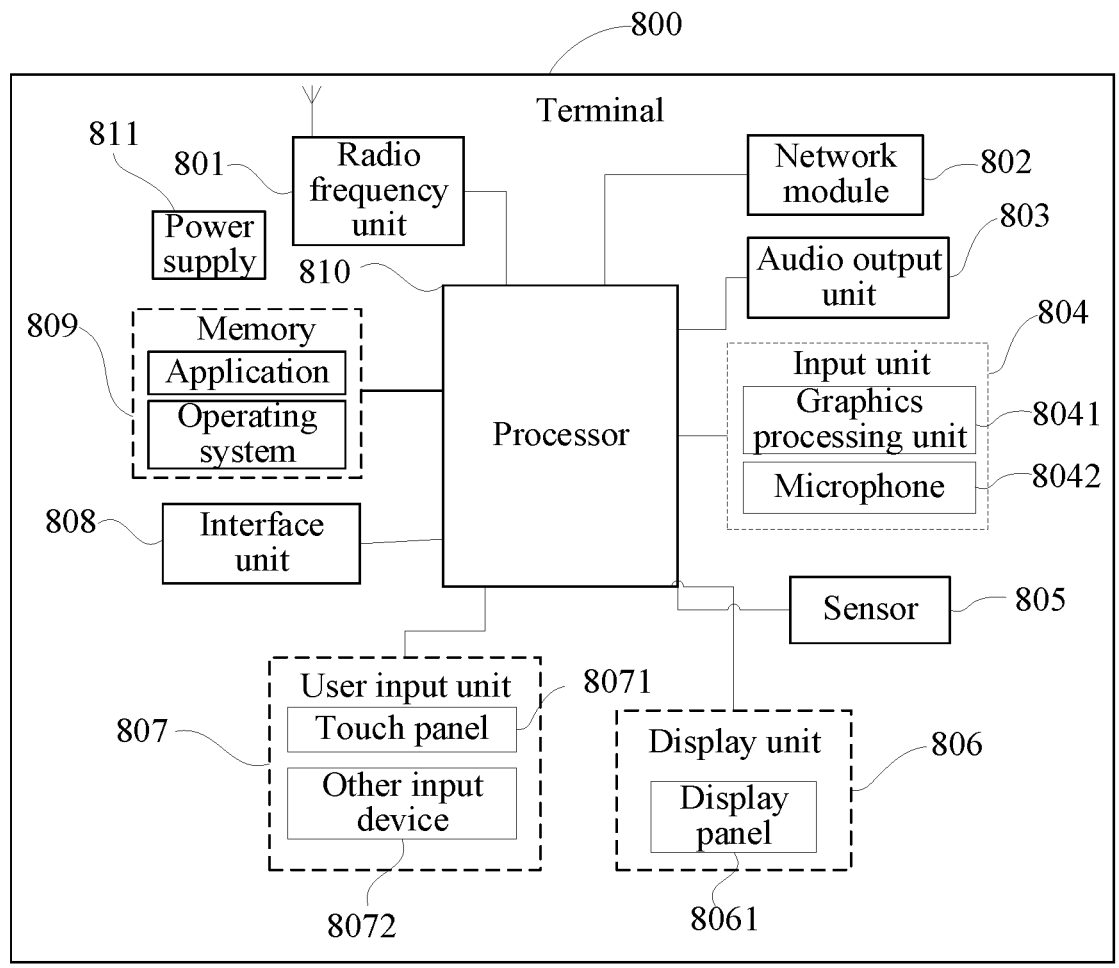
FIG. 8 is a schematic structural diagram of a terminal according to an embodiment of this application.

FIG. 8 is a schematic diagram of a hardware structure of a terminal according to embodiments of the present disclosure. The terminal 800 includes, but is not limited to, components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a terminal structure shown in FIG. 8 constitutes no limitation on the terminal, and the terminal may include more or fewer components than those shown in the figure, or some components may be combined, or a different component deployment may be used. In the embodiments of this application, the terminal includes, but is not limited to, a mobile phone, a tablet computer, a notebook computer, a palmtop computer, an in-vehicle terminal, a wearable device, a pedometer, and the like.

The processor 810 is configured to perform HARQ-ACK feedback for multicast downlink transmission and unicast downlink transmission in one time unit.

The terminal 800 of this embodiment of this application can implement processes of the method embodiment shown in FIG. 1, and can achieve the same technical effects. To avoid repetition, details are not described herein again.

It should be understood that, in this embodiment of this application, the radio frequency unit 801 may be configured to receive and transmit information or receive and transmit a signal during a call, and, after being received, downlink data from a base station is processed by the processor 810. In addition, uplink data is sent to the base station. Generally, the radio frequency unit 801 includes, but is not limited to, an antenna, at least one amplifier, a transceiver, a coupler, a low noise amplifier, a duplexer, and the like. In addition, the radio frequency unit 801 may further communicate with another device through a wireless communication system and network.

The terminal provides wireless broadband Internet access for a user through the network module 802, for example, help the user to send and receive emails, browse webpages, and access stream media, and the like.

The audio output unit 803 may convert audio data received by the radio frequency unit 801 or network module 802 or audio data stored on the memory 809 into audio signals and output the audio signals as sounds. Moreover, the audio output unit 803 may further provide an audio output (for example, a call signal receiving sound or a message receiving sound) related to a specific function implemented by the terminal 800. The audio output unit 803 includes a speaker, a buzzer, a receiver, and the like.

The input unit 804 is configured to receive an audio signal or a video signal. The input unit 804 may include a graphics processing unit (GPU) 8041 and a microphone 8042. The GPU 8041 is configured to process image data of a static picture or a video that is captured by an image capturing apparatus (for example, a camera) in a video capture mode or an image capture mode. The processed image frame may be displayed on the display unit 806. The image frame that has been processed by the graphics processing unit 8041 may be stored on the memory 809 (or another storage medium) or sent by using the radio frequency unit 801 or network module 802. The microphone 8042 may receive a sound, and can process the sound into audio data. The processed audio data may be converted, in a phone call mode, into a format that may be sent to a mobile communication base station via the radio frequency unit 801 and be output.

The terminal 800 further includes at least one sensor 805 such as an optical sensor, a motion sensor, and another sensor. In some embodiments, the optical sensor includes an ambient light sensor and a proximity sensor. The ambient light sensor may adjust luminance of the display panel 8061 according to the luminance of the ambient light, and the proximity sensor may switch off the display panel 8061 and/or backlight when the terminal 800 is moved to the ear. As a type of motion sensor, an acceleration sensor can monitor magnitudes of accelerations in various directions (generally, on three axes), may detect a magnitude and a direction of the gravity in a static state, and may be applied to recognizing an attitude of the terminal (for example, switching between landscape orientation and portrait orientation, a related game, and magnetometer attitude calibration), a function related to vibration recognition (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, and the like, and details are not described herein.

The display unit 806 is configured to display information entered by the user or information provided for the user. The display unit 806 may include a display panel 8061. The display panel 8061 may be configured in a form of a liquid crystal display (LCD), an organic light-emitting diode (OLED), or the like.

The user input unit 807 may be configured to receive input digit or character information, and generate key signal input related to the user setting and function control of the terminal. In some embodiments, the user input unit 807 includes a touch panel 8071 and another input device 8072. The touch panel 8071, also referred to as a touchscreen, may collect a touch operation of a user on or near the touch panel (such as an operation of a user on or near the touch panel 8071 by using any suitable object or attachment, such as a finger or a touch pen). The touch panel 8071 may include two parts: a touch monitoring apparatus and a touch controller. The touch detection apparatus detects a touch orientation of the user, detects a signal brought by the touch operation, and transmits the signal to the touch controller. The touch controller receives touch information from the touch monitoring apparatus, converts the touch information into a contact coordinate, then transmits the contact coordinate to the processor 810, and receives and executes a command transmitted by the processor 810. In addition, the touch panel 8071 may be implemented by using various types, such as a resistive type, a capacitive type, an infrared type, and a surface acoustic wave type. In addition to the touch panel 8071, the user input unit 807 may further include the another input device 8072. In some embodiments, the another input device 8072 may include, but not limited to, a physical keyboard, a functional key (such as a volume control key or a switch key), a track ball, a mouse, and a joystick, which is not described herein in detail.

Further, the touch panel 8071 may cover the display panel 8061. After detecting a touch operation on or near the touch panel 8071, the touch panel transfers the touch operation to the processor 810, so as to determine a type of the touch event. Then, the processor 810 provides corresponding visual output on the display panel 8061 according to the type of the touch event. Although, in FIG. 8, the touch panel 8071 and the display panel 8061 are used as two separate parts to implement input and output functions of the terminal, in some embodiments, the touch panel 8071 and the display panel 8061 may be integrated to implement the input and output functions of the terminal. Details are not limited herein.

The interface unit 808 is an interface between an external apparatus and the terminal 800. For example, the external apparatus may include a wired or wireless headset port, an external power supply (or a battery charger) port, a wired or wireless data port, a storage card port, a port used to connect an apparatus having an identification module, an audio input/output (Input/Output, I/O) port, a video I/O port, an earphone port, and the like. The interface unit 808 may be configured to receive an input (such as data information or electric power) from an external apparatus and transmit the received input to one or more elements in the terminal 800 or may be configured to transmit data between the terminal 800 and the external apparatus.

The memory 809 may be configured to store a software program and various data. The memory 809 may mainly include a program storage region and a data storage region. The program storage region may store an operating system, an application required by at least one function (for example, a sound playback function or an image playback function), and the like. The data storage region may store data (for example, audio data and a phone book) created according to use of the mobile phone. In addition, the memory 809 may include a high speed random access memory, and may further include a non-volatile memory, such as at least one magnetic disk storage device, a flash memory device, or other non-volatile solid state storage devices.

The processor 810 is the control center of the terminal, and is connected to various parts of the terminal by using various interfaces and lines. By running or executing the software program and/or module stored in the memory 809, and invoking data stored in the memory 809, the processor 810 performs various functions and data processing of the terminal, thereby performing overall monitoring on the terminal. In some embodiments, the processor 810 may include one or more processing units. In some embodiments, the processor 810 may integrate an application processor and a modem processor. The application processor mainly processes an operating system, a user interface, an application, and the like. The modem processor mainly processes wireless communication. It may be understood that the modulation and demodulation processor may not be integrated into the processor 810.

The terminal 800 further includes the power supply 811 (such as a battery) for supplying power to the components. In some embodiments, the power supply 811 may be logically connected to the processor 810 by a power management system, thereby implementing functions, such as charging, discharging, and power consumption management, by using the power management system.

In addition, the terminal 800 may further include some functional module that are not shown, which are not described herein in detail.

Figure 9:
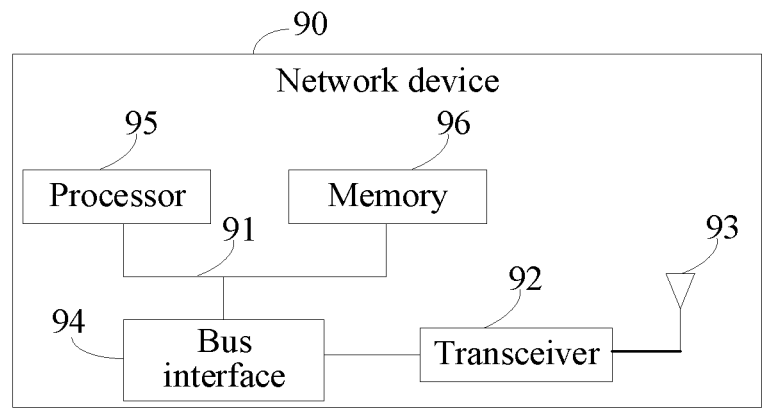
FIG. 9 is a schematic structural diagram of a network device according to an embodiment of this application.

FIG. 9 is a schematic diagram of a hardware structure of a network device that implements the embodiments of the present disclosure. The network device 90 includes, but is not limited to, a bus 91, a transceiver 92, an antenna 93, a bus interface 94, a processor 95, and a memory 96.

In this embodiment of this application, the network device 90 further includes a computer program stored in the memory 96 and executable on the processor 95. In some embodiments, the computer program, when executed by the processor 95, implements the following steps:

sending DCI to a terminal, where the DCI is used for scheduling the terminal to feed back HARQ-ACK information of multicast downlink transmission and unicast downlink transmission only in different time units; or the DCI is used for scheduling the terminal to feed back HARQ-ACK information of multicast downlink transmission and unicast downlink transmission in different time units or on non-overlapping uplink resources in a same time unit; or the DCI is used for scheduling the terminal to feed back HARQ-ACK information of multicast downlink transmission and unicast downlink transmission on non-overlapping uplink resources.

The transceiver 92 is configured to send and receive data under the control of the processor 95.

The network device 90 of this embodiment of this application can implement processes of the method embodiment shown in FIG. 5, and can achieve the same technical effects. To avoid repetition, details are not described herein again.

In FIG. 9, in a bus architecture (represented by a bus 91), the bus 91 may include any number of interconnected buses and bridges, and the bus 91 connects various circuits including one or more processors represented by a processor 95 and memories represented by a memory 96. The bus 91 may further connect various other circuits such as a peripheral device, a voltage stabilizer, and a power management circuit. These are known in the art, and therefore are not further described in this specification. The bus interface 94 provides an interface between the bus 91 and the transceiver 92. The transceiver 92 may be one component or a plurality of components. For example, a plurality of receivers and transmitters provide a unit configured to communicate with various other apparatuses on a transmission medium. Data processed by the processor 95 is transmitted on a wireless medium by using an antenna 93. Further, the antenna 93 further receives data and transfers the data to the processor 95.

The processor 95 is responsible for managing the bus 91 and general processing, and may provide various functions, including timing, peripheral interfacing, voltage adjustment, power management, and another control function. The memory 96 may be configured to store data used by the processor 95 when the processor 95 performs an operation.

The embodiments of this application further provide a computer-readable storage medium, storing a computer program, where when executed by a processor, the computer program may implement processes of the embodiments of the information feedback method or processes of the embodiments of the resource scheduling method, and can achieve the same technical effects. To avoid repetition, details are not described herein again. The computer-readable storage medium may, for example, be a Read-Only Memory (ROM), a Random Access Memory (RAM), a magnetic disk, or an optical disc.

The embodiments of this application further provide a chip, including a processor and a communication interface, where the communication interface is coupled to the processor, and the processor is configured to execute a program or instructions, to implement processes of the embodiments of the foregoing information feedback method or processes of the embodiments of the foregoing resource scheduling method, and can achieve the same technical effects. To avoid repetition, details are not described herein again.

It should be noted that, the chip mentioned in the embodiments of this application may also be referred to as a system-level chip, a system chip, a chip system, a system on chip, or the like.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by a sentence "including one" does not exclude that there are still other same elements in the process, method, object, or apparatus.

A person skilled in the art can clearly understand that for convenience and conciseness of description, for specific working processes of the foregoing described system, apparatus and unit, reference may be made to the corresponding processes in the foregoing method embodiments, and details are not described herein.

In the embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments hereof.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented through software and a necessary general hardware platform, and may also be implemented by hardware. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

A person of ordinary skill in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be implemented. The storage medium may be a magnetic disc, an optical disc, a read-only memory (ROM), or a random access memory (RAM).

It may be understood that the embodiments described in the embodiments of the present disclosure may be implemented by hardware, software, firmware, middleware, microcode, or a combination thereof. For hardware implementation, modules, units, and subunits may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information feedback method, comprising:
performing hybrid automatic repeat request acknowledgment (HARQ-ACK) feedback for multicast downlink transmission and unicast downlink transmission in one-time-unit slot, wherein the multicast downlink transmission is scheduled by multicast downlink control information (DCI) and the unicast downlink transmission is scheduled by unicast DCI,
wherein the performing HARQ-ACK feedback for multicast downlink transmission and unicast downlink transmission comprises:
constructing a first HARQ-ACK codebook of the multicast downlink transmission and a second HARQ-ACK codebook of the unicast downlink transmission respectively; and
multiplexing the first HARQ-ACK codebook and the second HARQ-ACK codebook to a target feedback resource for transmission, wherein the target feedback resource is determined from a target feedback resource set according to indication of a last piece of the unicast DCI.

2. The information feedback method according to claim 1, wherein the target feedback resource set is determined from a feedback resource set corresponding to the unicast downlink transmission based on a number of bits of the multiplexed HARQ-ACK.

3. The information feedback method according to claim 1, wherein when HARQ-ACK feedback manners corresponding to multicast Physical Downlink Shared Channel (PDSCH) and unicast PDSCH are both dynamic feedback and the multicast PDSCH comprises a Downlink Assignment Index (DAI) field, DAI of the multicast PDSCH and DAI of the unicast PDSCH are accumulated respectively.

4. The information feedback method according to claim 1, wherein multiplexing the first HARQ-ACK codebook and the second HARQ-ACK codebook to a target feedback resource for transmission comprises:
appending multicast HARQ-ACK after unicast HARQ-ACK.

5. A terminal, comprising:
a memory storing a computer program; and
a processor coupled to the memory and configured to execute the computer program to perform operations comprising:
performing hybrid automatic repeat request acknowledgment (HARQ-ACK) feedback for multicast downlink transmission and unicast downlink transmission in one slot, wherein the multicast downlink transmission is scheduled by multicast downlink control information (DCD) and the unicast downlink transmission is scheduled by unicast DCI,
wherein the performing HARQ-ACK feedback for multicast downlink transmission and unicast downlink transmission comprises:
constructing a first HARQ-ACK codebook of the multicast downlink transmission and a second HARQ-ACK codebook of the unicast downlink transmission respectively; and
multiplexing the first HARQ-ACK codebook and the second HARQ-ACK codebook to a target feedback resource for transmission, wherein the target feedback resource is determined from a target feedback resource set according to indication of a last piece of the unicast DCI.

6. The terminal according to claim 5, wherein the target feedback resource set is determined from a feedback resource set corresponding to the unicast downlink transmission based on a number of bits of the multiplexed HARQ-ACK.

7. The terminal according to claim 5, wherein when HARQ-ACK feedback manners corresponding to multicast Physical Downlink Shared Channel (PDSCH) and unicast PDSCH are both dynamic feedback and the multicast PDSCH comprises a Downlink Assignment Index (DAI) field, DAI of the multicast PDSCH and DAI of the unicast PDSCH are accumulated respectively.

8. The terminal according to claim 5, wherein multiplexing the first HARQ-ACK codebook and the second HARQ-ACK codebook to a target feedback resource for transmission comprises:
appending multicast HARQ-ACK after unicast HARQ-ACK.

9. A non-transitory computer-readable storage medium, storing a computer program, when the computer program is executed by a processor, causes the processor to perform operations comprising:
performing hybrid automatic repeat request acknowledgment (HARQ-ACK) feedback for multicast downlink transmission and unicast downlink transmission in one slot, wherein the multicast downlink transmission is scheduled by multicast downlink control information (DCD) and the unicast downlink transmission is scheduled by unicast DCI,
wherein the performing HARQ-ACK feedback for multicast downlink transmission and unicast downlink transmission comprises:
constructing a first HARQ-ACK codebook of the multicast downlink transmission and a second HARQ-ACK codebook of the unicast downlink transmission respectively; and
multiplexing the first HARQ-ACK codebook and the second HARQ-ACK codebook to a target feedback resource for transmission, wherein the target feedback resource is determined from a target feedback resource set according to indication of a last piece of the unicast DCI.

10. The non-transitory computer-readable storage medium according to claim 9, wherein the target feedback resource set is determined from a feedback resource set corresponding to the unicast downlink transmission based on a number of bits of the multiplexed HARQ-ACK.

11. The non-transitory computer-readable storage medium according to claim 9, wherein when HARQ-ACK feedback manners corresponding to multicast Physical Downlink Shared Channel (PDSCH) and unicast PDSCH are both dynamic feedback and the multicast PDSCH comprises a Downlink Assignment Index (DAI) field, DAI of the multicast PDSCH and DAI of the unicast PDSCH are accumulated respectively.

12. The non-transitory computer-readable storage medium according to claim 9, wherein multiplexing the first HARQ-ACK codebook and the second HARQ-ACK codebook to a target feedback resource for transmission comprises:

appending multicast HARQ-ACK after unicast HARQ-ACK.

\* \* \* \* \*